(12) United States Patent
Indukaev et al.

(10) Patent No.: US 6,778,052 B1
(45) Date of Patent: Aug. 17, 2004

(54) CONTACTLESS MAGNETIC SPIRAL GEAR AND VARIANTS THEREOF

(75) Inventors: Konstantin V. Indukaev, Moscow (RU); Pavel A. Osipov, Moscow (RU)

(73) Assignee: Obschestvo S Ogranichennoy Otvetsvennostu <Laboratorii Amfora>, Korolev M.O. (RU)

( * ) Notice: Subject to any disclaimer, the term of this patent is extended or adjusted under 35 U.S.C. 154(b) by 0 days.

(21) Appl. No.: 10/275,078
(22) PCT Filed: May 5, 2000
(86) PCT No.: PCT/RU00/00167
§ 371 (c)(1),
(2), (4) Date: Jun. 2, 2003
(87) PCT Pub. No.: WO01/88413
PCT Pub. Date: Nov. 22, 2001

(51) Int. Cl.[7] .................... F16H 25/24; G05G 11/00; H01F 7/20
(52) U.S. Cl. .................... 335/285; 335/306; 74/424.71; 74/DIG. 4
(58) Field of Search ................ 335/285, 288, 335/306; 74/89, 424.71, DIG. 4, 490.09

(56) References Cited

U.S. PATENT DOCUMENTS

| | | | | |
|---|---|---|---|---|
| 3,777,587 A | * | 12/1973 | Hoshina et al. | 74/89.23 |
| 5,456,134 A | * | 10/1995 | Bouwer et al. | 74/490.09 |
| 5,634,390 A | * | 6/1997 | Takeuchi et al. | 92/33 |
| 5,687,614 A | * | 11/1997 | Hashimoto et al. | 335/285 |
| 6,111,491 A | * | 8/2000 | Furuse et al. | 335/285 |

* cited by examiner

Primary Examiner—Ramon M. Barrera
(74) Attorney, Agent, or Firm—McDermott Will & Emery LLP (57) ABSTRACT

The invention relates to the precision machine manufacturing and can be used as a gear for creating an extra-precise linear drive in the machine-tool industry, metrology, optics and electronic industry.

A contactless magnetic screw gear (CMSG) comprises a screw (1) and a nut (2) including a permanent magnet (3) mounted between magnetic circuits (14) having pole pieces (4). A fine-modular thread is made on the screw (1) and the pole pieces (4), grooves of which thread are filled with a solid non-magnetic material flush with tops of the thread ridges. The screw (1) and the nut (2) interact each other via a radial gap (11). According to the second variant of the CMSG, the nut is provided with a housing in which are mounted N double length magnetic circuits and N double length pole pieces separated from each other with the permanent magnets. According to the third variant of the CMSG, the nut is provided with the housing to which a ring insert is rigidly connected, a multiple-start thread in made in that ring insert, and grooves of this thread are filled with a hard magnetic material forming the permanent magnets. According to the fourth variant of the CMSG, the aerostatical throttle element (12) is formed by a ring slot connected to the supplying channels through the radial gap (11) between the screw (1) and the nut (2).

18 Claims, 5 Drawing Sheets

CONTACTLESS MAGNETIC SPIRAL GEAR AND VARIANTS THEREOF

FIELD OF THE INVENTION

The invention relates to the precision machine-building industry and can be used as a gear for creating an extra-precise linear drive in the machine-tool industry, metrology, optics and electronic industry.

Known is a magnetic screw gear comprising a cylindrical permanent magnet having helicoidal magnetization, the magnet being placed in a steel housing, and a screw with a spiral thread being made from ferromagnetic material and placed inside a nut with an air gap (International Conference on Micromechatronics for Information and Precision Equipment, Tokyo, Jul. 20–23, 1997).

The disadvantages of the known magnetic screw gear are low rigidity and low maximal carrying ability, since it is impossible to provide a sharp boundary between magnetized and non-magnetized sections of the cylindrical magnet.

Known is a magnetic screw gear comprising a screw and a nut interacting each other via an air radial gap, a permanent magnet and threaded pole pieces are mounted within the nut. Thread grooves of the screw and nut are filled with a non-magnetic material, the screw and nut having thread sections made from a ferromagnetic material, and radial openings being made in the nut or screw in order to supply a compressed fluid medium to the gap between the screw and the nut (USSR Certificate of Authorship No 1219850, Int. Cl. F 16 H 25/24, 1986).

The above described technical solution is the closest one to the invention according to a generality of problems being solved, and is chosen as the prior art.

However, the known magnetic screw gear has an insufficient kinematical accuracy and gear rigidity, as well as a technologically complex embodiment and large overall dimensions.

SUMMARY OF THE INVENTION

Technical result of the invention is in creating a contactless magnetic screw gear having an increased kinematical accuracy and gear rigidity with small overall dimensions.

Moreover, a saving of scarce materials is provided, and an adaptability to manufacture is increased when producing.

The essence of the invention consists in that a new contactless magnetic screw gear (CMSG) is created.

According to the first variant, the CMSG comprises a screw and a nut interacting each other via a radial gap, a permanent magnet and threaded pole pieces are mounted within the nut, the screw thread ridges being made from a ferromagnetic material, and the screw thread grooves and pole piece thread grooves being filled with a solid non-magnetic material. In the nut are made supplying channels intended for supplying a compressed fluid medium to the radial gap between the screw and the nut.

According to the first variant, the distinctive features of the CMSG are in introducing two magnetic circuits made in the form of coaxial rings, two aerostatical throttle units placed from two sides at the nut edges, two start rings mounted on the end faces of the nut, and a non-magnetic ring distance piece. The permanent magnet is made in the form of the ring magnetized along the axis of the nut and is mounted between magnetic circuit end faces faced each other, the pole pieces are made in the form of sleeves each being rigidly connected to the internal surface of the corresponding magnetic circuit, the non-magnetic ring distance piece is mounted between internal end faces of the pole pieces within the permanent magnet ring. Every aerostatical throttle unit is mounted in recesses of the magnetic circuit, adjoins the end face of the corresponding pole piece and is connected to the supplying channel formed by an opening made in the magnetic circuit.

The aerostatical throttle unit comprises an aerostatical throttle element, at least two ring separating grooves joined with a cross-over axial groove, the aerostatical throttle element being connected to the supplying channel through the ring separating grooves.

The aerostatical throttle element has three structural embodiments:
in the form of a ring from a porous material;
in the form of a ring with openings which have nozzles mounted therein;
in the form of calibrated slots.

According to the second variant, the CMSG comprises a screw and a nut interacting each other via a radial gap, a permanent magnet and threaded pole pieces are mounted within the nut, the screw thread ridges being made from ferromagnetic material, and the screw thread grooves and pole piece thread grooves being filled with a solid non-magnetic material. In the nut are made supplying channels intended for supplying a compressed fluid medium to the radial gap between the screw and the nut.

According to the second variant, the distinctive features of the CMSG are in introducing two magnetic circuits and N double length magnetic circuits made in the form of coaxial rings, N double length pole pieces, N permanent magnets, (N+1) non-magnetic ring distance pieces, where N≦1, two aerostatical throttle units placed from two sides at the nut edges, and two start rings mounted on the end faces of the nut. The nut is provided with a housing made from a non-magnetic material. The pole pieces and N the double length pole pieces are made in the form of sleeves each being rigidly connected to the internal surface of the corresponding magnetic circuit and N double length magnetic circuits. The permanent magnets are made in the form of the rings magnetized along the axis of the nut from the materials differing by a coercive force value, said permanent magnet being mounted behind the end face of the first magnetic circuit, and N-th one of the introduced permanent magnets being mounted behind the end face of the N-th double length magnetic circuit.

First one of the (N+1) non-magnetic ring distance pieces is mounted between internal end faces of the pole piece and the first double length pole piece inside the first permanent magnet ring, and every N-th non-magnetic ring distance piece is mounted after N-th double length pole piece inside the N-th permanent magnet ring.

Every aerostatical throttle unit is mounted in a recesses in the housing between the end faces of the corresponding pole piece and the start ring, and is connected to the supplying channel being formed by an opening made in the nut housing.

The screw is provided with an axial opening being hollow or filled with a bar from a non-magnetic material.

According to the third variant, the CMSG comprises a screw and a nut interacting each other via a radial gap, the screw thread ridges being made from a ferromagnetic material, and screw thread grooves being filled with a solid non-magnetic material, in the nut are made supplying channels intended for supplying a compressed fluid medium to the radial gap between the screw and the nut.

According to the third variant, the distinctive features of the CMSG are in introducing two aerostatical throttle units placed from two sides at the nut edges, two start rings and a ring thin-walled insert from a ferromagnetic material, the nut being provided with a housing made from a non-magnetic material, with which housing the ring insert being rigidly connected.

A multiple-start thread is made in the ring insert through its whole thickness, the thread grooves filled with a hard magnetic material form the helicoidal permanent magnets with the axial magnetization, the permanent magnets of even and odd starts of the thread being made from a material differing by a coercive force value, and magnetization directions of adjacent permanent magnets being opposite. A height of the helicoidal permanent magnets is less than a depth of the thread grooves for a thickness of a protective layer made from a non-magnetic material.

The start rings are mounted on the end faces of the nut, every aerostatical throttle unit is mounted in a recesses in the housing, adjoins the start ring and is connected to the supplying channel formed by an opening made in the nut housing, and the screw is provided with an axial opening being hollow or filled with a bar from a non-magnetic material.

The aerostatical throttle units and aerostatical throttle elements in the second and third variants of the CMSG have the same structural embodiment as in the first variant.

According to the fourth variant, the CMSG comprises a screw and a nut interacting each other via a radial gap, a permanent magnet and threaded pole pieces are mounted within the nut, the screw thread ridges being made from a ferromagnetic material, and the screw thread grooves and pole piece thread grooves being filled with a solid non-magnetic material. In the nut are made supplying channels intended for supplying a compressed fluid medium to the radial gap between the screw and the nut.

According to the fourth variant, the distinctive features of the CMSG are in introducing two magnetic circuits made in the form of coaxial rings, two aerostatical throttle units placed from two sides at the nut edges, two start rings mounted on the end faces of the nut, and a non-magnetic ring distance piece. The permanent magnet is made in the form of the ring magnetized along the axis of the nut, and is mounted between magnetic circuit end faces faced each other.

The pole pieces are made in the form of sleeves each being rigidly connected to internal surface of the corresponding magnetic circuit, the non-magnetic ring distance piece is mounted between internal end faces of the pole pieces within the permanent magnet ring, in which ring distance piece a T-shaped channel and a ring separating groove are made.

Every aerostatical throttle unit, through the radial gap between the screw and the nut and through the ring separating groove, is connected to the supplying channel formed by a radial opening made in one of the magnetic circuits and aligned with the T-shaped channel.

The aerostatical throttle unit in the fourth variant of the CMSG is made in the form of a ring slot formed by a cylindrical section of the internal surface of the start ring and a screw surface, a height of the ring slot being less than the radial gap between the screw and the nut.

Figure 1:
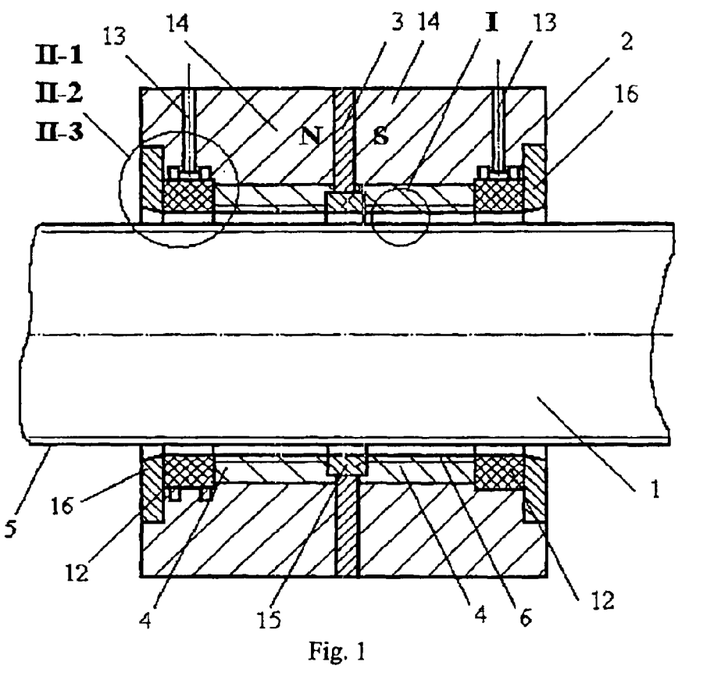
FIG. 1 shows the first variant of the contactless magnetic screw gear.

FIG. 1 has the following numerals: a screw 1, a nut 2, a permanent magnet 3, pole pieces 4, threads 5 and 6 of the screw 1 and the nut 2, correspondingly, aerostatical throttle elements 12, a supplying channel 13, magnetic circuits 14, a non-magnetic ring distance piece 15, start rings 16.

Figure 2:
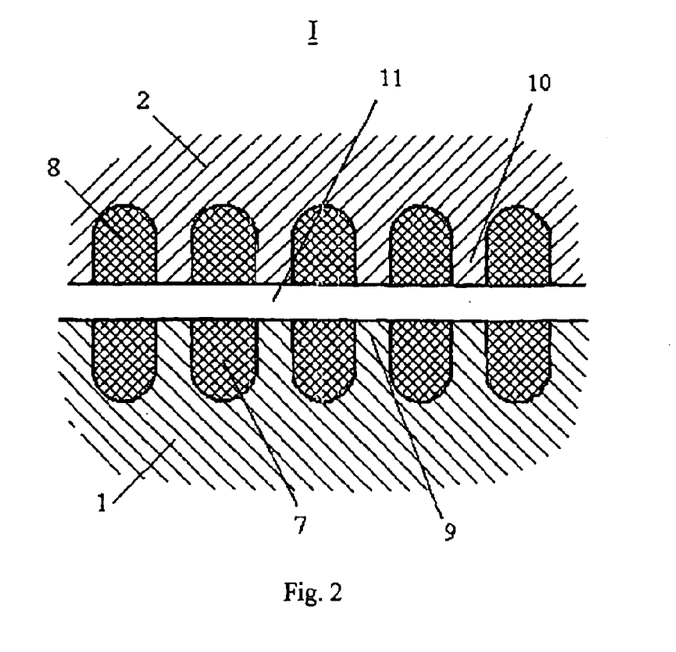
FIG. 2 shows the unit I in FIG. 1.

FIG. 2 has the following numerals: a screw 1, a nut 2, a non-magnetic filling 7 and 8 of the thread grooves of the screw 1 and the nut 2, correspondingly, thread ridges 9 and 10 of the screw 1 and the nut 2, correspondingly, a radial-gap 11 between the screw 1 and the nut 2.

Figure 3:
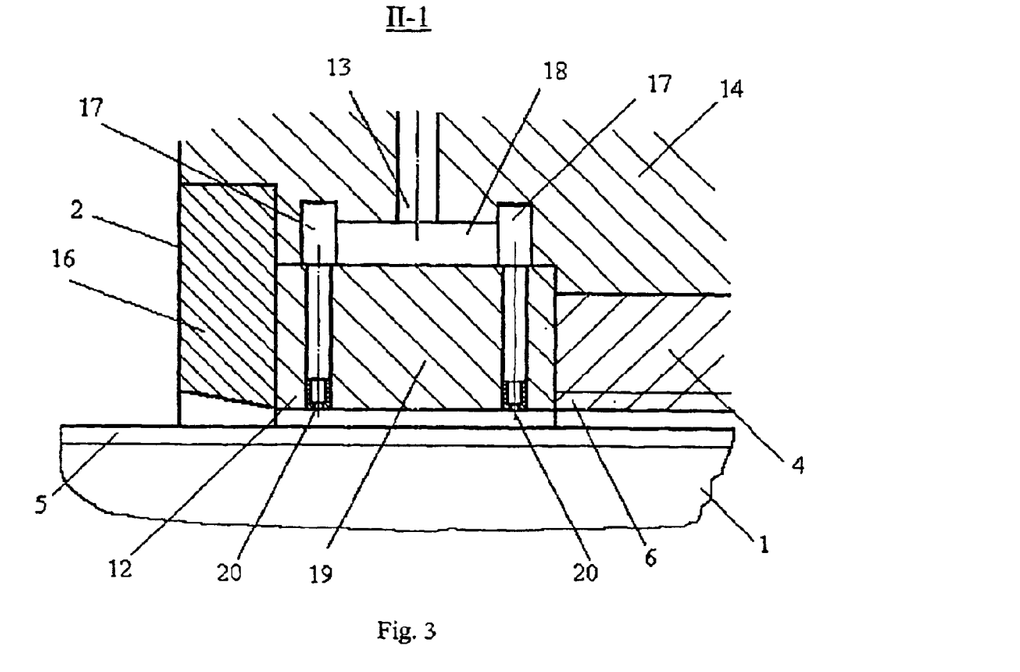
FIG. 3 shows the unit II-1 in FIG. 1.

FIG. 3 has the following numerals: a screw 1, a nut 2, a pole piece 4, threads 5 and 6 of the screw 1 and the nut 2, correspondingly, an aerostatical throttle element 12, magnetic circuit 14, ring separating grooves 17, a cross-over groove 18, a start ring 16, a ring 19, and nozzles 20.

Figure 4:
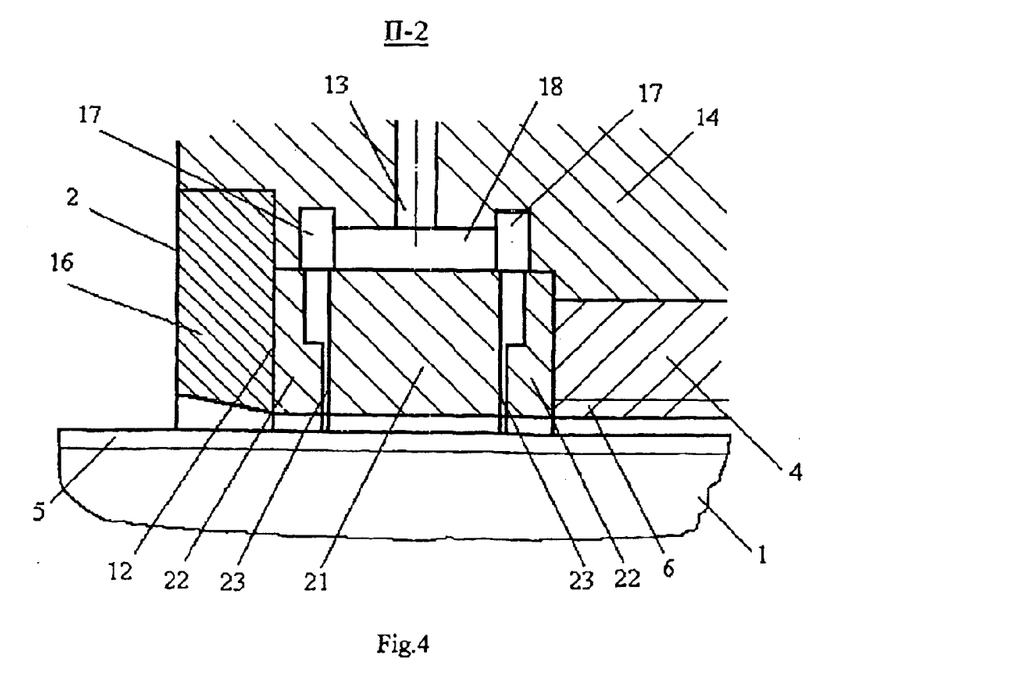
FIG. 4 shows the unit II-2 in FIG. 1.

FIG. 4 has the following numerals: a screw 1, a nut 2, a pole piece 4, threads 5 and 6 of the screw 1 and the nut 2, correspondingly, an aerostatical throttle element 12, a magnetic circuit 14, ring separating grooves 17, a cross-over groove 18, a start ring 16, a central ring 21, rings 22 with recess, and calibrated slot openings 23.

Figure 5:
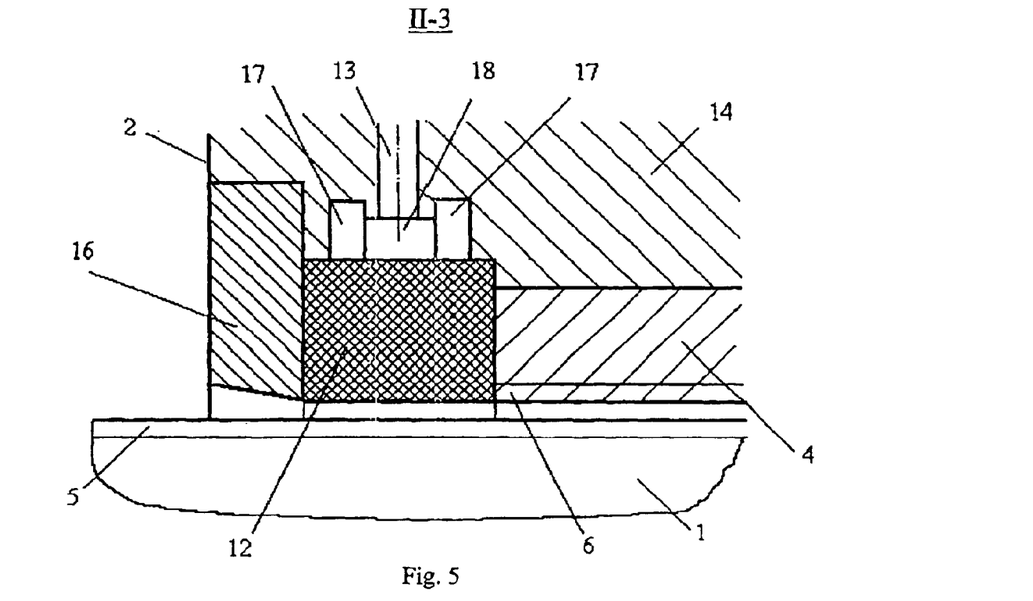
FIG. 5 shows the unit II-3 in FIG. 1.

FIG. 5 has the following numerals: a screw 1, a nut 2, a pole piece 4, threads 5 and 6 of the screw 1 and the nut 2, correspondingly, an aerostatical throttle element 12 (ring from porous material), a supplying channel 13, a magnetic circuit 14, ring separating grooves 17, a cross-over groove 18, a start ring 16.

Figure 6:
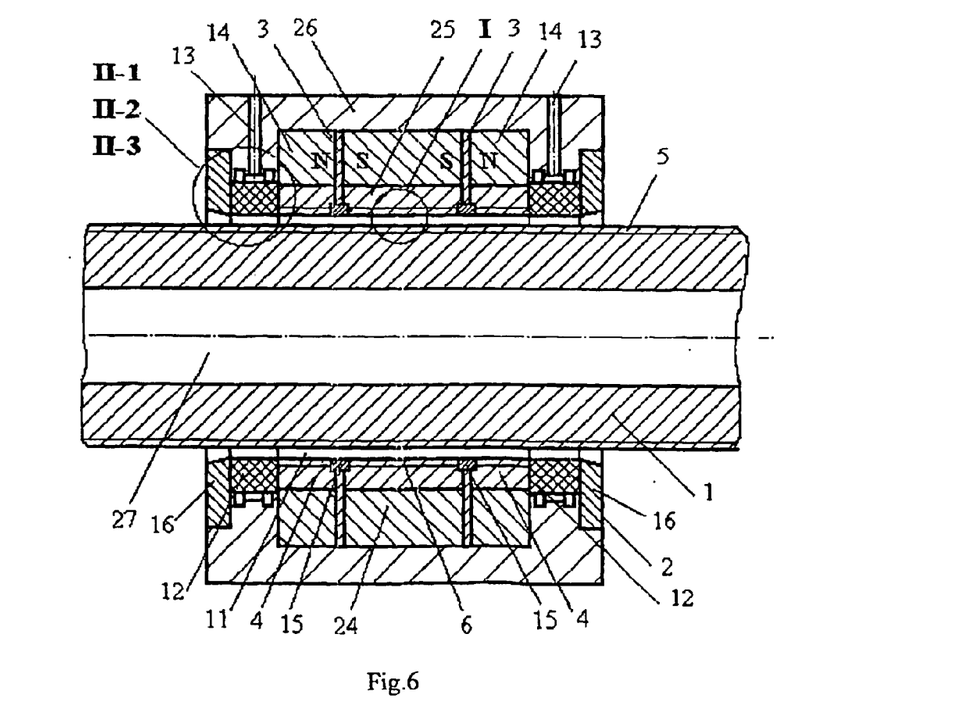
FIG. 6 shows the second variant of the contactless magnetic screw gear (unit I and units II-1, II-2, II-3 are shown in FIGS. 2–5)

FIG. 6 has the following numerals: a screw 1, a nut 2, permanent magnets 3, pole pieces 4, threads 5 and 6 of the screw 1 and the nut 2, correspondingly, aerostatical throttle elements 12, a supplying channel 13, magnetic circuits 14, a non-magnetic ring distance piece 15, start rings 16, a double length magnetic circuit 24 (in FIG. 6 CMSG is shown having one double length magnetic circuit, i.e. N=1), a double length pole piece 25, a housing 26 of the nut 2, a central cavity or bar 27 of the screw 1.

Figure 7:
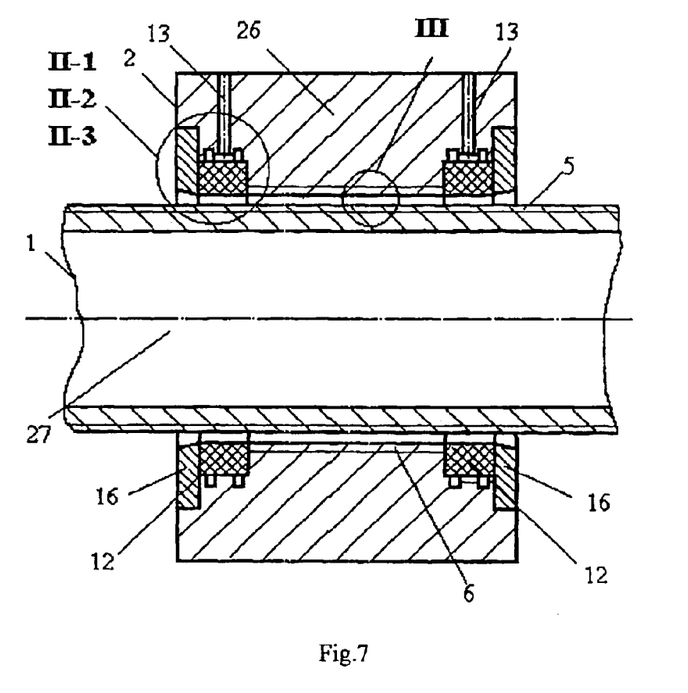
FIG. 7 shows the third variant of the contactless magnetic screw gear.

FIG. 7 has the following numerals: a screw 1, a nut 2, threads 5 and 6 of the screw 1 and the nut 2, correspondingly, aerostatical throttle elements 12, supplying channels 13, start rings 16, a housing 26 of the nut 2, a central cavity or bar 27 of the screw 1.

Figure 8:
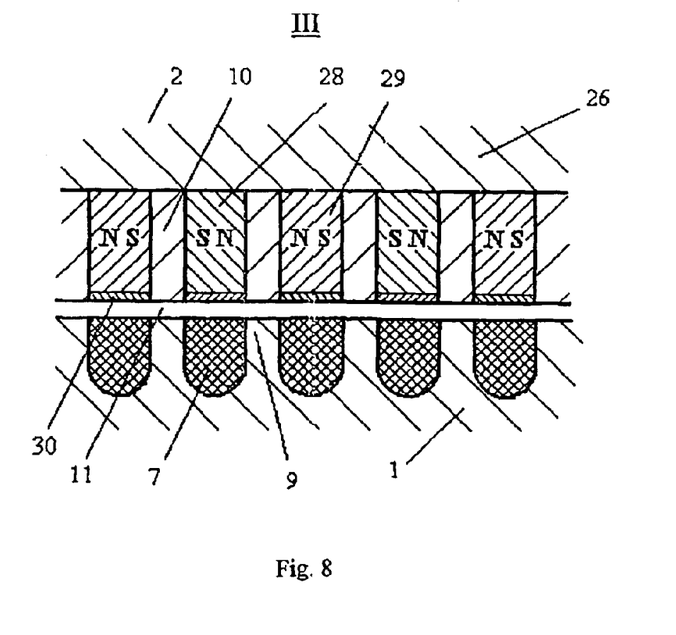
FIG. 8 shows the unit III in FIG. 7.

FIG. 8 has the following numerals: a screw 1, a nut 2, a non-magnetic filling 7 of the thread grooves of the screw 1, thread ridges 9 and 10 of the screw 1 and the nut 2, correspondingly, a radial gap 11 between the screw 1 and the nut 2, helicoidal permanent magnets 28 and 29 with the axial direction of the magnetization, the permanent magnets 29 having opposite direction of the magnetization, a protective layer 30.

Figure 9:
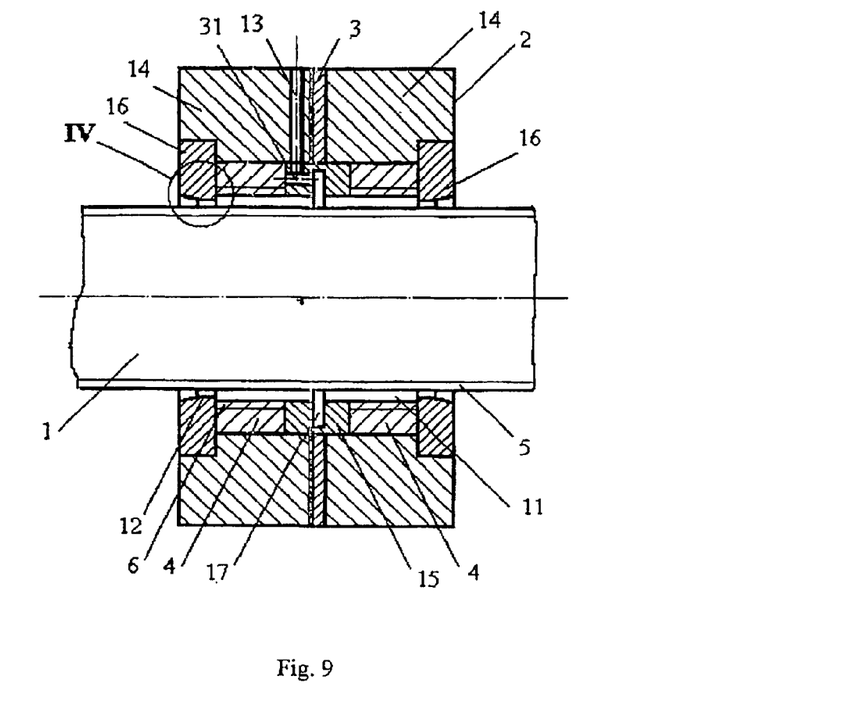
FIGS. 9 and 10 illustrate the fourth variant of the contactless magnetic screw gear.

FIG. 9 has the following numerals: a screw 1, a nut 2, a permanent magnet 3, pole pieces 4, threads 5 and 6 of the screw 1 and the nut 2, correspondingly, aerostatical throttle elements 12, a supplying channel 13, magnetic circuits 14, a non-magnetic ring distance piece 15, start rings 16, a ring separating groove 17, and a T-shaped channel 31.

Figure 10:
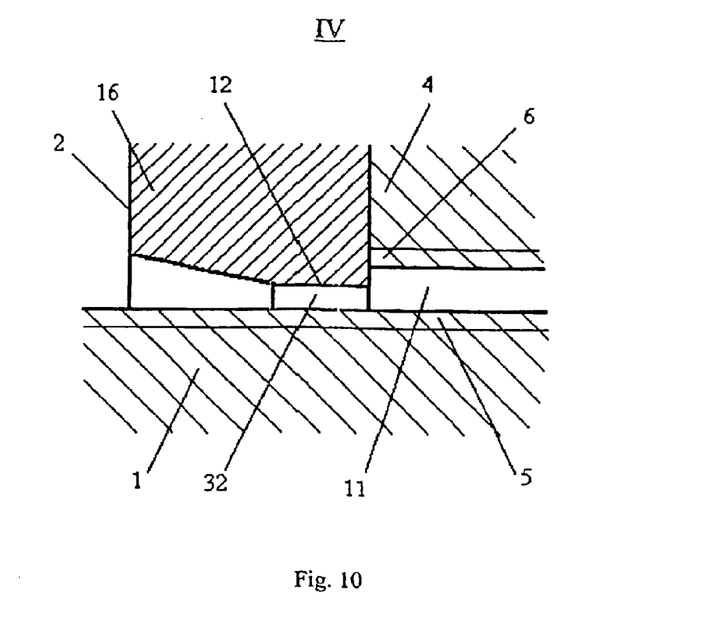

FIG. 10 has the following numerals: a screw 1, a nut 2, a pole piece 4, threads 5 and 6 of the screw 1 and the nut 2, correspondingly, a radial gap 11 between the screw 1 and the nut 2, an aerostatical throttle element 12, a start ring 16, and a ring slot 32.

Best Embodiment of the Invention

A contactless magnetic screw gear (CMSG) according to the first, second, third and fourth variants of its implementation (FIG. 1, FIG. 6, FIG. 9) comprises a screw 1, ridges 9 of a fine-modular thread 5 of the screw 1 are filled with a solid non-magnetic material, and grooves 7 are filled with the solid non-magnetic material flush with tops of the thread ridges 9. A nut 2 interacts with the screw 1 via a radial gap 11, the nut 2 includes two magnetic circuits 14 made in the form of coaxial rings, pole pieces 4 made in the form of sleeves are rigidly connected to internal surfaces of those coaxial rings.

A permanent magnet 3 is made in the form of a ring having a magnetization direction along its axis, and, according to the first and second variants CMSG (FIG. 1 and FIG. 9), is mounted between end faces of the magnetic circuits 14, faced each other.

According to the second variant of the CMSG implementation (FIG. 6), the nut 2 is provided with a housing 26 made from a non-magnetic material with a low or-negative coefficient of thermal expansion, and also includes N double length magnetic circuits 24 made in the form of coaxial rings, N double length pole pieces 25 are rigidly connected to internal surfaces of those coaxial rings.

The first one of said permanent magnets 3 is mounted behind the first magnetic circuit 14, and N-th of the introduced permanent magnets 3 is mounted behind the N-th double length magnetic circuit 24, the permanent magnets being made from materials differing by a coercive force value.

According to the first and fourth variants of the CMSG (FIG. 1 and FIG. 9), the pole pieces 4, and also, according to the second variant of the CMSG, the double length pole pieces 25 are made in the form of sleeves with a fine-modular thread 6 which grooves 8 are filled with a solid non-magnetic material flush with tops of ridges 10 of the thread 6. For example, a polymer anti-friction compound could be used as the solid non-magnetic material, and, according to the second variant, a step of magnetizing the CMSG being performed as an assembly.

In the second variant of the CMSG (FIG. 6) the screw 1 made from a ferromagnetic material is provided with an axial opening being hollow or filled with a bar 27 from a non-magnetic material, for example, from ceramics or Invar, thickness of walls of the screw 1 being determined by conditions of the ferromagnetic material saturation.

According to the first and second variants of the CMSG (FIG. 1 and FIG. 6), a non-magnetic ring distance piece 15 is placed within the ring of every of the permanent magnets 3, and it being worthwhile to make that ring distance piece with the width in the axial direction no less than the width of the ring of the permanent magnet 3, and, according to fourth variant of the CMSG (FIG. 9), it being worthwhile to have the width of the ring distance piece 15 greater than the width of the ring of the permanent magnet 3.

A fluid compressed medium, for example, fluid or gas, is supplied to the radial gap 11 through a supplying channel 13 formed by a radial opening made in the magnetic circuits 14 on the edges of the nut 2 according to first variant of the CMSG (FIG. 1), in the housing 26 on the edges of the nut 2 according to second variant of the CMSG (FIG. 6 and FIG. 7), and according to fourth variant of the CMSG implementation (FIG. 9), the supplying channel 13 is formed by a radial opening made in one of the magnetic circuits 14, the opening being aligned with a T-shaped channel 31 made in the non-magnetic ring distance piece 15.

The aerostatical throttle element 12 is connected to the supplying channel 13 through the ring separating grooves 17 joined with a cross-over axial groove 18, thereby providing a connection of the aerostatical throttle units to the external source of the compressed fluid medium.

The aerostatical throttle element 12 can be made in the form of a ring from a porous material, for example, graphite (FIG. 5), or in the form of a metal or ceramic ring 19 in which openings the nozzles 20 (FIG. 3) are mounted, or in the form of calibrated slots 23 formed by the set of three metal or ceramic rings, the length of the central ring 21 being equal to the length of the cross-over axial groove 18, and ring recesses being made in two end rings 22 (FIG. 4).

The aerostatical throttle element 12, according to the fourth variant of the CMSG (FIG. 10), is made in the form of a ring slot 32 formed by a cylindrical section of the internal surface of the start ring 16 and the surface of the screw 1, a height of the ring slot 32 being less than the radial gap 11 between the screw 1 and the nut 2, the ring slot 32 being connected to the supplying channel 13 via the radial gap 11 and the ring separating groove 17 made in the non-magnetic ring distance piece 15 in perpendicular to the T-shaped channel 31.

According to the third variant of the CMSG (FIG. 7), a ring thin-walled insert from a ferromagnetic material is rigidly connected to a housing 26 of the nut 2 made from a non-magnetic material, in which insert a two-start thread is made through the whole thickness of the ring insert.

The thread grooves of the ring insert are filled with a hard magnetic material and form helicoidal permanent magnets 28 and 29 having the axial magnetization, the permanent magnets of even and odd starts of the thread being made from materials differing by coercive force values, and magnetization directions of adjacent permanent magnets are opposite.

A height of the helicoidal permanent magnets 28 and 29 is less than a depth of the thread grooves for a thickness of a protective layer 30 made from a non-magnetic material, the total height of the permanent magnets and the protective layer being equal to the height of the ridge 10.

The screw 1, similar with the second variant of the CMSG, is provided with the opening filled with the bar 27, a required thickness of the magnetic material of the screw 1 determined by the conditions of its saturation being comparable with the thread step, thereby allowing to make the bar 27 of a greater diameter, and thus to compensate the thermal expansion and deformation of the screw 1 of the CMSG.

The start rings 16 made from a non-magnetic material are mounted on both end faces of the nut 2 according to all variants of the CMSG.

The contactless magnetic screw gear (CMSG) operates as follows.

The screw 1 and the nut 2 interacts each other via the radial gap 11, into which gap the compressed fluid medium (fluid of gas) is supplied from the external source.

When rotating the screw 1, a shift of the thread ridges 9 of the screw 1 occurs relative to the thread ridges 10 of the nut 2 (FIG. 2), thereby causing the occurrence of an axial force and movement of the nut 2. The compressed fluid medium supplied to the gap 11 between the screw 1 and the nut 2 fixes the nut 2 with the high accuracy relative to the screw 1 in the radial direction, the film of the compressed fluid or compressed gas providing the fluid character of the friction in the gap, and the rigidity of the aerostatical suspension compensating the force instability of the radial magnetic force.

According to the third variant of the CMSG, the magnetic flow closes in the screw 1 between adjacent thread ridges of differing parity starts.

An arrangement of the aerostatical throttle elements 12 at the edges of the nut 2 provides a high specific aerostatical carrying capability of the nut 2 in the radial direction relative to the screw 1, thereby allowing, at the cost of increasing the area of the thread surface of the nut 2, to increase the kinematical accuracy and rigidity of the gear.

Industrial Applicability

The above described embodiments of the CMSG allow the create nanometric long-distance (several hundreds mm) gear having a high kinematical accuracy and rigidity with small overall dimensions of the CMSG.

The CMSG made in accordance with the second variant provides a greater kinematical accuracy and rigidity of the gear and has increased dimensions of the thread section of the nut at its smaller external diameter, as well as provides a saving of scarce materials and increases adaptability to manufacture when producing the CMSG.

The CMSG made in accordance with the third variant allows, with a high kinematical accuracy and rigidity of the gear, to decrease 1000 times the consumption of scare materials and provides a dimension stability of the CMSG elements in a wide temperature range.

Moreover, CMSG made in accordance with the fourth variant has, with a high kinematical accuracy and rigidity of the gear, the more technologically simple embodiment of the aerostatical throttle element and the CMSG structure, thereby increasing an adaptability to manufacture it when producing.

All the mentioned ensures a great practical applicability of the invention and allows to create a new class of contactless magnetic screw gears.

What is claimed is:

1. A contactless magnetic screw gear comprising a screw and a nut interacting each other via a radial gap, a permanent magnet and threaded pole pieces mounted within the nut, the screw thread ridges being made from a ferromagnetic material, and the screw thread grooves and pole piece thread grooves being filled with a solid non-magnetic material, in the nut are made supplying channels intended for supplying a compressed fluid medium to the radial gap between the screw and the nut, characterized in that two magnetic circuits made in the form of coaxial rings, two aerostatical throttle units placed from two sides at the nut edges, two start rings mounted on the end faces of the nut, and a non-magnetic ring distance piece are introduced into the nut, the permanent magnet being made in the form of a ring magnetized along the axis of the nut and mounted between magnetic circuits end faces faced each other, the pole pieces being made in the form of sleeves each being rigidly connected to the internal surface of the corresponding magnetic circuit, the non-magnetic ring distance piece being mounted between internal end faces of the pole pieces within the permanent magnet ring, every aerostatical throttle unit being mounted in recesses of the magnetic circuit, adjoining the end face of the corresponding pole piece and being connected to the supplying channel formed by an opening made in the magnetic circuit.

2. A contactless magnetic screw gear comprising a screw and a nut interacting each other via a radial gap, a permanent magnet and threaded pole pieces mounted within the nut, the screw thread ridges being made from a ferromagnetic material, and the screw thread grooves and pole piece thread grooves being filled with a solid non-magnetic material, in the nut are made supplying channels intended for supplying a compressed fluid medium to the radial gap between the screw and the nut, characterized in that two magnetic circuits and N double length magnetic circuits made in the form of coaxial rings, N double length pole pieces, N permanent magnets, (N+1) non-magnetic ring distance pieces, where $N \leq 1$, two aerostatical throttle units placed from two sides at the nut edges, and two start rings mounted on the end faces of the nut are introduced into the nut, the nut being provided with a housing made from a non-magnetic material, the pole pieces and N double length pole pieces being made in the form of sleeves each being rigidly connected to the internal surface of the corresponding magnetic circuit and N double length magnetic circuits, the permanent magnets being made in the form of the rings magnetized along the axis of the nut from the materials differing by a coercive force value, said permanent magnet being mounted behind the end face of the first magnetic circuit, and N-th one of the introduced permanent magnets being mounted behind the end face of the N-th double length magnetic circuit, every aerostatical throttle unit being mounted in recesses of the housing between the end faces of the corresponding pole piece and the start ring and being connected to the supplying channel formed by an opening made in the nut housing, the first one of the (N+1) non-magnetic ring distance pieces being mounted between internal end faces of the pole piece and the first double length pole piece within the first permanent magnet ring, and every N-th non-magnetic ring distance piece being mounted behind the N-th double length pole piece within the N-th permanent magnet ring, and the screw being provided with an axial opening being hollow or filled with a bar a from non-magnetic material.

3. A contactless magnetic screw gear comprising a screw and a nut interacting each other via a radial gap, the screw thread ridges being made from a ferromagnetic material, and the screw thread grooves being filled with a solid non-magnetic material, in the nut are made supplying channels intended for supplying a compressed fluid medium to the radial gap between the screw and the nut, characterized in that two aerostatical throttle units placed from two sides at the nut edges, two start rings and a ring thin-walled insert from a ferro-magnetic material are introduced into the nut, the nut being provided with a housing made from a non-magnetic material, with which housing the ring insert being rigidly connected, a multiple-start thread being made in the ring insert through its whole thickness, the thread grooves being filled with a hard magnetic material forming the helicoidal permanent magnets with the axial magnetization, the permanent magnets of even and odd starts of the thread being made from a material differing by a coercive force value, and the magnetization directions of adjacent permanent magnets being opposite, the start rings being mounted on the end faces of the nut, every aerostatical throttle unit being mounted in recesses in the housing, adjoining the start ring and being connected to the supplying channel formed by an opening made in the nut housing, and the screw being provided with an axial opening being hollow or filled with a bar from a non-magnetic material.

4. The contactless magnetic screw gear according to claim 3 characterized in that the height of the helicoidal permanent magnets is less than a depth of the thread grooves for a thickness of a protective layer made from a non-magnetic material.

5. The contactless magnetic screw gear according to claim 1 characterized in that the aerostatical throttle unit comprises an acrostatical throttle element, at least two ring separating grooves joined with a cross-over axial groove, the aerostatical throttle element being connected to the supplying channel through the ring separating grooves.

6. The contactless magnetic screw gear according to claim 5 characterized in that the aerostatical throttle element is made in the form of a ring from a porous material.

7. The contactless magnetic screw gear according to claim 5 characterized in that the aerostatical throttle element is made in the form of a ring with openings which have nozzles mounted therein.

8. The contactless magnetic screw gear according to claim 5 characterized in that the aerostatical throttle element is made in the form of calibrated slots formed by the set of three rings, the length of the central ring being equal to the length of the cross-over axial groove, and ring recesses being made in the end rings.

9. A contactless magnetic screw gear comprising a screw and a nut interacting each other via a radial gap, a permanent magnet and threaded pole pieces being mounted in the nut, the screw thread ridges being made from ferromagnetic material, and the screw thread grooves and pole piece thread grooves being filled with solid non-magnetic material, in the nut are made supplying channels intended for supplying a compressed fluid medium to the radial gap between the screw and the nut, characterized in that two magnetic circuits made in the form of coaxial rings, two aerostatical throttle units placed from two sides at the nut edges, two start rings mounted on the end faces of the nut, and a non-magnetic ring distance piece are introduced into the nut, the permanent magnet being made in the form of a ring magnetized along the axis of the nut and being mounted between magnetic circuits end faces faced each other, the pole pieces being made in the form of sleeves each being rigidly connected to the internal surface of the corresponding magnetic circuit, the non-magnetic ring distance piece being mounted between internal end faces of the pole pieces within the permanent magnet ring, in which ring distance piece a T-shaped channel and a ring separating groove being made, and every aerostatical throttle unit, through the radial gap between the screw and the nut and through the ring separating groove, being connected to the supplying channel formed by a radial opening made in one of the magnetic circuits and aligned with the T-shaped channel.

10. The contactless magnetic screw gear according to claim 9 characterized in that the aerostatical throttle unit is made in the form of a ring slot formed by a cylindrical section of the internal surface of the start ring and screw surface, and a height of the ring slot being less than the radial gap between the screw and the nut.

11. The contactless magnetic screw gear according to claim 2, characterized in that the aerostatical throttle unit comprises an aerostatical throttle element, at least two ring separating grooves joined with a cross-over axial groove, the acrostatical throttle element being connected to the supplying channel through the ring separating grooves.

12. The contactless magnetic screw gear according to claim 11 characterized in that the aerostatical throttle element is made in the form of a ring from a porous material.

13. The contactless magnetic screw gear according to claim 11 characterized in that the aerostatical throttle element is made in the form of a ring with openings which have nozzles mounted therein.

14. The contactless magnetic screw gear according to claim 11 characterized in that the aerostatical throttle element is made in the form of calibrated slots formed by the set of three rings, the length of the central ring being equal to the length of the cross-over axial groove, and ring recesses being made in the end rings.

15. The contactless magnetic screw gear according to claim 3 characterized in that the arrostatical throttle unit comprises an aerostatical throttle element, at least two ring separating grooves joined with a cross-over axial groove, the aerostatical throttle element being connected to the supplying channel through the ring separating grooves.

16. The contactless magnetic screw gear according to claim 15 characterized in that the aerostatical throttle element is made in the form of a ring from a porous material.

17. The contactless magnetic screw gear according to claim 15 character in that the aerostatical throttle element is made in the form of a ring with openings which have nozzles mounted therein.

18. The contactless magnetic screw gear according to claim 15 characterized in that the aerostatical throttle element is made in the form of calibrated slots formed by the set of three rings, the length of the central ring being equal to the length of the cross-over axial groove, and ring recesses being made in the end rings.

* * * * *